(No Model.)
E. C. VOM HOFE.
FISHING REEL.
No. 563,964. Patented July 14, 1896.
FIG. 2.
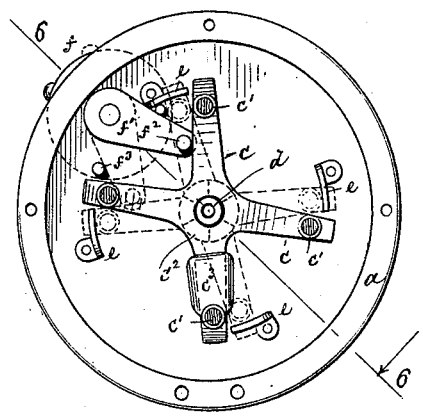
FIG. 3.
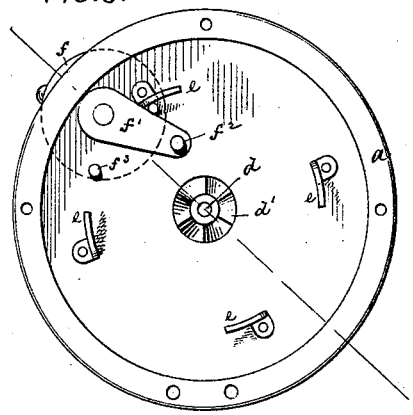
FIG. 1.
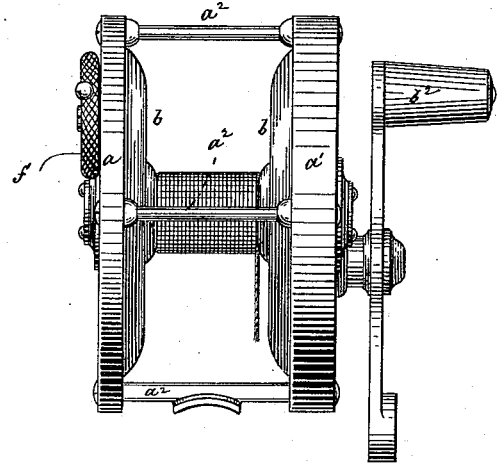
FIG. 4.
FIG. 5.
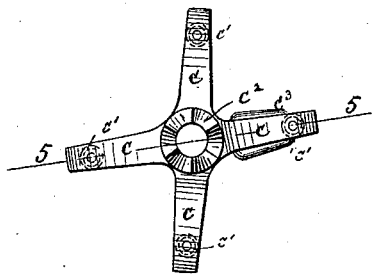
FIG. 6.   FIG. 7.
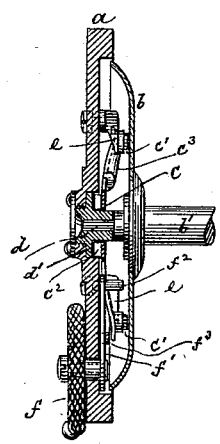
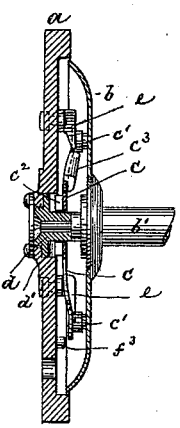
Witnesses:
John Becker.
Wm. G. Whiting
Inventor:
Edward Charles Vom Hofe
by his attorneys
Roeder & Briesen
THE NORRIS PETERS CO., PHOTO-LITHO., WASHINGTON, D. C.

UNITED STATES PATENT OFFICE.

EDWARD CHARLES VOM HOFE, OF BROOKLYN, NEW YORK.

FISHING-REEL.

SPECIFICATION forming part of Letters Patent No. 563,964, dated July 14, 1896.

Application filed February 27, 1896. Serial No. 581,050. (No model.)

*To all whom it may concern:*

Be it known that I, EDWARD CHARLES VOM HOFE, of Brooklyn, Kings county, New York, have invented an Improved Fishing-Reel, of which the following is a specification.

This invention relates to a fishing-reel, and more particularly to a tension device that acts upon the line during the time of angling, but is automatically removed the moment the line is reeled in. Thus while the line is kept under perfect control and is prevented from kinking when subjected to a sudden pull, it may nevertheless be freely reeled in at any moment to safely land the fish.

In the accompanying drawings, Figure 1 is a rear elevation of my improved fishing-reel; Fig. 2, an inner face view of the head $a$ with the brake in place; Fig. 3, a similar view with the brake removed; Fig. 4, a face view of the brake; Fig. 5, a section on line 5 5, Fig. 4; Fig. 6, a section on line 6 6, Fig. 2; and Fig. 7, a similar section showing the parts in a different position and with the hand-wheel omitted.

The letters $a$ $a'$ represent the two heads of a fishing-reel connected by the rods $a^2$, as usual, and forming the supporting-frame for the spool upon which the line is wound. This spool consists of a shaft $b'$, carrying the disks $b$ and revolved by the handle $b^2$. Between the head $a$ and its adjoining disk $b$ my improved tension mechanism is confined in such a manner that it is fully concealed and protected.

The tension mechanism consists essentially of a resilient slotted brake or spider $c$, centered upon a boss $d$, which is set into the head $a$, and forms the bearing for one end of the shaft $b'$. The brake or spider $c$ is provided with any suitable number of arms, that are bent with their free ends toward the disk $b$, and carry the brake-shoes $c'$, adapted to make contact with the disk.

While fishing, the brake $c$ is bodily moved toward the disk $b$, so as to tightly friction against the same, but when the line is hauled in the brake is at once automatically moved away from the disk, so as to take off the tension. This action is obtained primarily by means of a pair of coöperating inclined planes or clutch-jaws, of which one is formed upon the brake $c$ and the other upon the head $a$. The movable jaw $c^2$ is integral with the brake $c$, and is made in the form of a raised ring projecting from the outer face of the same. This jaw is composed of six more or less inclined faces or teeth with intervening pockets, Figs. 4 and 5, the whole resembling a face wheel. The fixed jaw $d'$, that forms a support for the jaw $c^2$, and consequently for the brake $c$, is arranged around the boss $d$, Fig. 3, and corresponds exactly in form, location, and arrangement of teeth to the jaw $c^2$. It is clear that when the brake $c$ is slightly rotated, so that the teeth of the jaws $d'$ $c^2$ are brought out of engagement or ride up on one another, the shoes $c'$ will be forced against the disk $b$ to apply the tension, while when the teeth of the jaws are brought into engagement with the opposite pockets the shoes will recede from the disk to take off the tension.

In order to permit the tension to be put entirely out of action, I secure to the inner face of the head $a$ a number of catches or hooks $e$, having beveled bills that are adapted to engage the arms of the brake $c$ and crowd them toward the head $a$ and away from the disk $b$.

The brake $c$ is rotated by means of a hand-wheel $f$ fulcrumed to the outer face of head $a$. The shaft of this wheel projects through the head $a$, and carries on its inner end an arm $f'$, provided with a pin $f^2$. The pin $f^2$ occupies a position between two of the arms of brake $c$, and thus by rotating the wheel $f$ such brake will be correspondingly rotated upon the boss $d$. A stop $f^3$, projecting inwardly from head $a$ between two of the arms of brake $c$, is adapted to limit the motion of wheel $f$, and also of the brake $c$.

For casting the line the wheel $f$ is so revolved that it will push the arms of brake $c$ beneath the hooks $e$, (dotted lines, Fig. 2,) and thus the tension is off and the line can be freely played out. After the line is so played out, the wheel $f$ is rotated to release the brake-arms from the hooks, when such arms, owing to their resiliency, will with their free ends approach the disk $b$. One arm of brake $c$ is weighted, as at $c^3$, and thus the brake, immediately upon its release, will slightly rotate, so as to cause the teeth of its jaw $c^2$ to rise up on the teeth of the jaw $d'$. The result of this slight motion is to bring the brake-shoes $c'$ into positive frictional contact with the disk $b$, Fig. 7. If now a fish pulls on the line, the latter will be played out under tension, because the disk $b$ tends to pull the brake $c$ around with it; but as the latter is stopped by pin $f^3$ the teeth of the jaws $c^2$ $d'$ will simply rise up on one another, and a constant tendency for the brake $c$ to crowd toward the disk $b$ is created as long as the spool is revolved. This tension on the line is highly desirable, as it will not only put the hooked fish under better control, but will also prevent the line from overrunning or kinking on the reel.

When the angler reels his line in, (with or without the fish hooked,) the tension is instantly and automatically taken off. This is due to the fact that as soon as the outward revolution of the spool ceases the tendency of the brake $c$ to revolve with the spool will also cease. Consequently the jaw $c^2$ will lose its tendency to revolve or rise on the jaw $d'$, and the pressure exerted by the disk $b$ against the brake $c$ will now force the teeth of the jaw $c^2$ into the corresponding pockets of the jaw $d'$, Fig. 6. In this way the brake-shoes recede from the disk $b$ sufficient to take off the tension.

It will be seen that in my improved reel the tension is automatically taken off the moment the pull on the line ceases, and that while the line has been previously subjected to the action of the tension mechanism it can at any moment and without setting the brake mechanism be at once hauled in freely.

That such a construction facilitates the handling of reel and line and greatly improves the chances of landing the fish will be obvious to anglers.

What I claim is—

1. In a fishing-reel the combination of a spool with a brake having a toothed section, a toothed support adapted to engage the same, a stop to limit the motion of the brake, and mechanism for rotating the brake, substantially as specified.

2. In a fishing-reel the combination of a spool with a resilient brake having a weighted arm and a toothed section, a toothed support adapted to engage the same, a stop to limit the motion of the brake, and mechanism for rotating the brake, substantially as specified.

3. In a fishing-reel, the combination of a spool with a brake having a toothed section, a correspondingly-toothed support, catches adapted to engage the brake, a stop to limit the motion of the brake, and mechanism for rotating the brake, substantially as specified.

EDWARD CHARLES VOM HOFE.

Witnesses:
W. G. WHITING,
F. V. BRIESEN.